United States Patent
Nakazawa et al.

(10) Patent No.: US 8,170,071 B2
(45) Date of Patent: May 1, 2012

(54) LASER APPARATUS

(75) Inventors: Masataka Nakazawa, Miyagi (JP);
Akihito Suzuki, Kyoto (JP); Toshihiko Hirooka, Miyagi (JP); Masato Yoshida, Miyagi (JP); Kazunori Shiota, Miyagi (JP)

(73) Assignees: Masataka Nakazawa, Miyagi (JP);
Advantest Corporation, Tokyo (JP)

( * ) Notice: Subject to any disclaimer, the term of this patent is extended or adjusted under 35 U.S.C. 154(b) by 93 days.

(21) Appl. No.: 12/398,191

(22) Filed: Mar. 5, 2009

(65) Prior Publication Data

US 2010/0061408 A1 Mar. 11, 2010

Related U.S. Application Data

(63) Continuation of application No. PCT/JP2007/067341, filed on Sep. 5, 2007.

(30) Foreign Application Priority Data

Sep. 8, 2006 (JP) .................................. 2006-244684

(51) Int. Cl.
*H01S 3/30* (2006.01)

(52) U.S. Cl. .................. 372/6; 372/68; 372/69; 372/92; 372/94; 372/96; 359/341.1; 359/341.4; 359/344; 359/346

(58) Field of Classification Search .............. 372/6, 68, 372/69, 92, 94, 96; 359/341.1, 341.4, 344; 359/346

See application file for complete search history.

(56) References Cited

U.S. PATENT DOCUMENTS

| | | | | |
|---|---|---|---|---|
| 6,134,250 | A  * | 10/2000 | Koren et al. | 372/6 |
| 6,272,165 | B1 * | 8/2001 | Stepanov et al. | 372/6 |
| 6,301,272 | B1 * | 10/2001 | Koch et al. | 372/6 |
| 6,538,807 | B2 * | 3/2003 | Kakui et al. | 359/341.5 |
| 6,567,432 | B1 * | 5/2003 | Kim et al. | 372/6 |
| 6,771,415 | B2 * | 8/2004 | Endo et al. | 359/341.5 |
| 6,788,713 | B1 * | 9/2004 | Stepanov et al. | 372/6 |
| 7,627,006 | B2 * | 12/2009 | Doucet et al. | 372/6 |
| 2003/0193715 | A1* | 10/2003 | Endo et al. | 359/342 |
| 2006/0262387 | A1* | 11/2006 | Haruna et al. | 359/341.1 |

OTHER PUBLICATIONS

Nakazawa et al., 10GHz, 2ps regeneratively and harmonically FM mode-locked erbium fibre ring laser, Electronics Letters Jul. 4, 1996 Vo.32 no. 14, p. 1285- p. 1287.
Suzuki et al., An Ultralow noise and Narrow Linewidth λ/4-shifted DFB Er-Doped Fiber Laser With a Ring Cavity Configuration, IEE Photonics Technollogy Letters. vol. 19, No. 19, Oct. 1, 2007, p. 1463-p. 1465.

* cited by examiner

*Primary Examiner* — Yuanda Zhang
(74) *Attorney, Agent, or Firm* — Jianq Chyun IP Office

(57) ABSTRACT

Provided is a laser apparatus including: a DFB fiber laser 40 including, as an amplitude medium, a rare earth doped silica optical fiber codoped with a high concentration of aluminum; an optical feedback path 50 formed by a ring-shaped optical fiber; and an optical coupler 70 a) feeding back a part of an output of the DFB fiber laser 40 to the DFB fiber laser 40 via the optical feedback path 50, and b) outputting, to outside, another part of the output of the DFB fiber laser 40, where the optical fiber forming the optical feedback path 50 is longer than a length at which a relaxation oscillation noise in the output to the outside becomes −110 dB/Hz.

10 Claims, 13 Drawing Sheets

LASER APPARATUS

CROSS REFERENCE TO RELATED APPLICATION

This is a continuation application of PCT/JP2007/067341 filed on Sep. 5, 2007 which claims priority from a Japanese Patent Application NO. 2006-244684 filed on Sep. 8, 2006, the contents of which are incorporated herein by reference.

BACKGROUND

1. Technical Field

The present invention relates to a laser apparatus. In particular, the present invention relates to a laser apparatus including a λ/4-shifted DFB (Distributed Feedback) fiber laser and a ring resonator.

2. Related Art

One type of lasers that oscillate in a single longitudinal mode is a DFB laser. A DFB laser includes, as an optical feedback path, a diffraction grating formed for example by periodically modulating the refraction index of an optical waveguide.

FIG. 1 is a partial sectional diagram schematically showing the structure of a semiconductor DFB laser 90. As shown in the drawing, in the semiconductor DFB laser 90, an InGaAsP active layer 93 and a p-InGaAsP waveguide layer 92 are sequentially stacked inside a buffer layer 94 on an n-InP substrate 96. In addition, a diffraction grating 91 is formed in the boundary between the InGaAsP active layer 93 and the p-InGaAsP waveguide layer 92.

As shown in "1.5-μm λ/4-shifted InGaAsP/InP DFB Lasers," J. of Lightwave Technol., vol. 5, no. 11, pp. 1564-1573 (1987), the semiconductor DFB laser 90 equipped with a diffraction grating that includes a phase shift corresponding to λ/4 is able to stably oscillate in a single longitudinal mode. Because of its single longitudinal mode oscillation as well as small size and low cost, the semiconductor DFB laser 90 has been widely used as a light source for optical communication.

FIG. 2 schematically shows a structure of a DFB fiber laser 40, which is formed by applying the technology of the λ/4-shifted lasers mentioned above to optical fibers. As shown in the drawing, the gain medium of the DFB fiber laser 40 is a rare-earth-element-doped core between a non-output end 42 and an output end 44. In addition, this core includes a diffraction grating 41 that includes a phase shift 43 corresponding to λ/4, and contains a distribution feedback structure by means of FBG (Fiber Bragg Grating). This DFB fiber laser 40 has a narrower linewidth compared to a semiconductor laser, and has an advantage such as easy connection with an optical fiber on the transmission path.

FIG. 3 schematically shows a structure of a DFB ring laser 100 that includes a ring resonator 130. As shown in this drawing, the DFB ring laser 100 includes a DFB structure 120 for single longitudinal mode operation, a ring resonator 130 formed by an annular optical waveguide 132, and an optical coupler 140 for taking out a part of light propagated in the ring resonator 130 to outside as an output. In addition, the DFB structure 120 is supplied with excitation light via a waveguide 110.

The DFB ring laser 100 is able to decrease an effective resonator loss by feeding back a laser oscillation signal to the DFB structure 120 via the ring resonator 130, thereby decreasing the laser oscillation threshold value condition, which is disclosed in the U.S. Pat. No. 6,272,165, and "Distributed-Feedback Ring All-Fiber Laser," OSA TOPS on Advanced Solid-State Lasers, vol. 1, pp. 291-295 (1996). In addition, the ring resonator 130 has a high Q value, which helps narrow the linewidth of an outputted laser.

For use as a light source for a fiber laser optical communication or the like, an optical fiber doped with a high concentration of erbium is already known for achieving a high laser output. A high concentration of erbium, however, will lead to a serious intensity fluctuation such as a pulse oscillation, due to energy transfer incident to generation of an erbium-ion pair. For the purpose of restraining the generation of such an ion pair, a method is known and has been implemented, to codope aluminum into the core of the optical fiber.

Also for the same purpose as mentioned above, it is also known to form a laser using an optical fiber in which the core is made of phosphate glass that contains erbium and ytterbium, and is surrounded by a ring-shaped silica glass clad that contains germanium and boron. This technique is disclosed for example in "High Performance Single Frequency Fiber Grating-Based Erbium:Ytterbium-Codoped Fiber Lasers," J. of Lightware. Technolo., vol. 16., no. 1, pp. 114-118 (1998), and "Efficient single-frequency fiber lasers with novel photosensitive Er/Yb optical fibers," Opt. Lett. Vol. 22, no. 10, pp. 694-696 (1997).

After the result of the aforementioned attempts, an optical fiber having a phosphate glass core turned out to achieve a higher laser output, with disadvantages of incurring higher manufacturing cost due to its complicated structure, as well as lack of long-term reliability attributable to the hygroscopic property of phosphate glass. This makes it difficult to put down to practice such an optical fiber having a phosphate glass core.

As opposed to this, a high-output laser apparatus obtained by doping a high concentration of erbium into a silica optical fiber is known to operate stably for a long period of time. The present invention therefore aims to enable a laser apparatus to be of high output by doping of a high concentration of erbium, as well as to emit further less noise by codoping of aluminum.

SUMMARY

Therefore, it is an object of an aspect of the innovations herein to provide a laser apparatus, which is capable of overcoming the above drawbacks accompanying the related art. The above and other objects can be achieved by combinations described in the independent claims. The dependent claims define further advantageous and exemplary combinations of the innovations herein.

According to the first aspect related to the innovations herein, one exemplary laser apparatus includes a DFB fiber laser including, as an amplitude medium, a rare earth doped silica optical fiber codoped with aluminum; an optical feedback path formed by a ring-shaped optical fiber; and an optical coupler a) feeding back a part of an output of the DFB fiber laser to the DFB fiber laser via the optical feedback path, and b) outputting, to outside, another part of the output of the DFB fiber laser, wherein the optical fiber forming the optical feedback path is longer than a length at which a relaxation oscillation noise in the output to the outside becomes −110 dB/Hz.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Embodiment Example 1

First, a DFB fiber laser 40 is created which includes a silica optical fiber, as a gain medium, into which erbium and aluminum are codoped. Specifically, the DFB fiber laser 40 has a polarization maintaining structure of a PANDA-type, and outputs single polarization. 0.4 wt % erbium and 12 wt % aluminum are codoped in the core. Accordingly, the amplitude noise attributable to the erbium ion pair is reduced.

Figure 1:
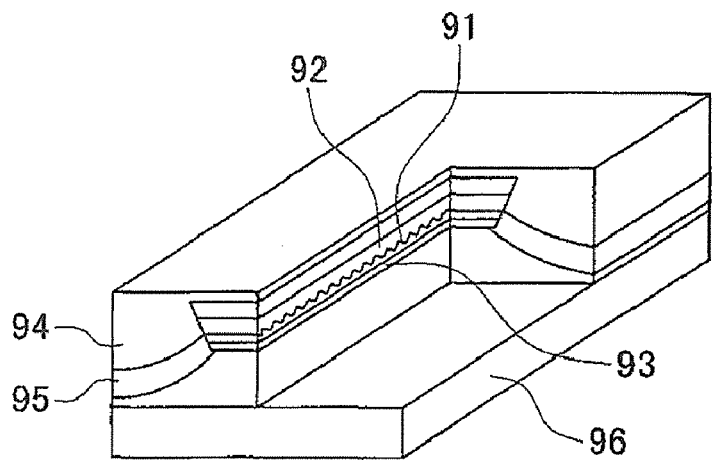
FIG. 1 schematically shows a structure of a semiconductor DFB laser 90.
Figure 2:
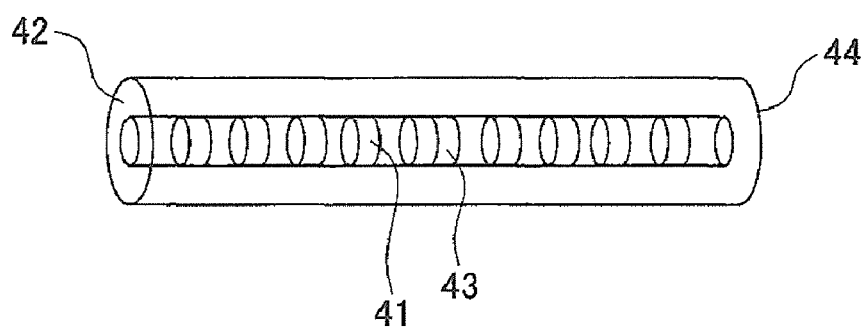
FIG. 2 schematically shows a structure of a DFB fiber laser 40.
Figure 3:
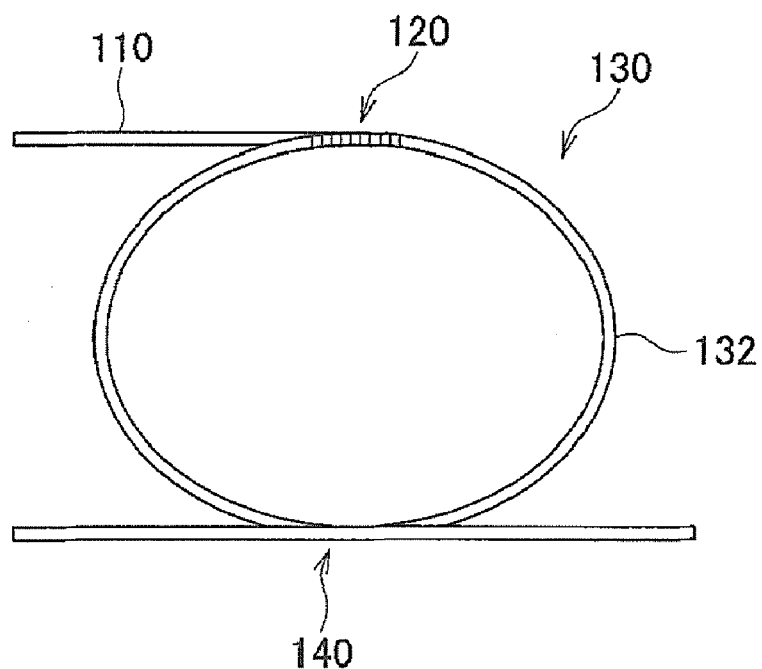
FIG. 3 schematically shows a structure of a DFB ring laser that includes a ring resonator 130 according to a ring waveguide.

In addition, a silica optical fiber forming this DFB fiber laser 40 has a distribution feedback structure formed by a FBG that includes a phase shift 43 corresponding to λ/4 as shown in FIG. 2. The diffraction grating 41 can be formed using a phase mask method. Specifically, about 14 cm length of the above polarization maintaining optical fiber doped with aluminum and erbium is irradiated with a fourth harmonic of a YAG laser operated by a Q switch at a wavelength of 266 nm. During this operation, a phase mask having a phase shift generating λ/4 shift is used, thereby generating a λ4-shifted diffraction grating 41 for the erbium doped optical fiber.

An excitation light source 10 formed by a semiconductor laser is used to inject excitation light of a wavelength of 1480 nm into the laser apparatus 300 created in the above manner, by which the DFB fiber laser 40 causes single longitudinal mode oscillation. The laser has an oscillation threshold excitation power of 10 mW, and pulse-oscillates until the excitation power reaches 100 mW. The laser successively oscillated stably as long as the excitation power is equal to or exceeds 100 mW. The DFB fiber laser 40, provided with a optical feedback path 50 formed by a annular optical fiber, is used to confirm the effect of making the laser to be a ring laser.

Figure 4:
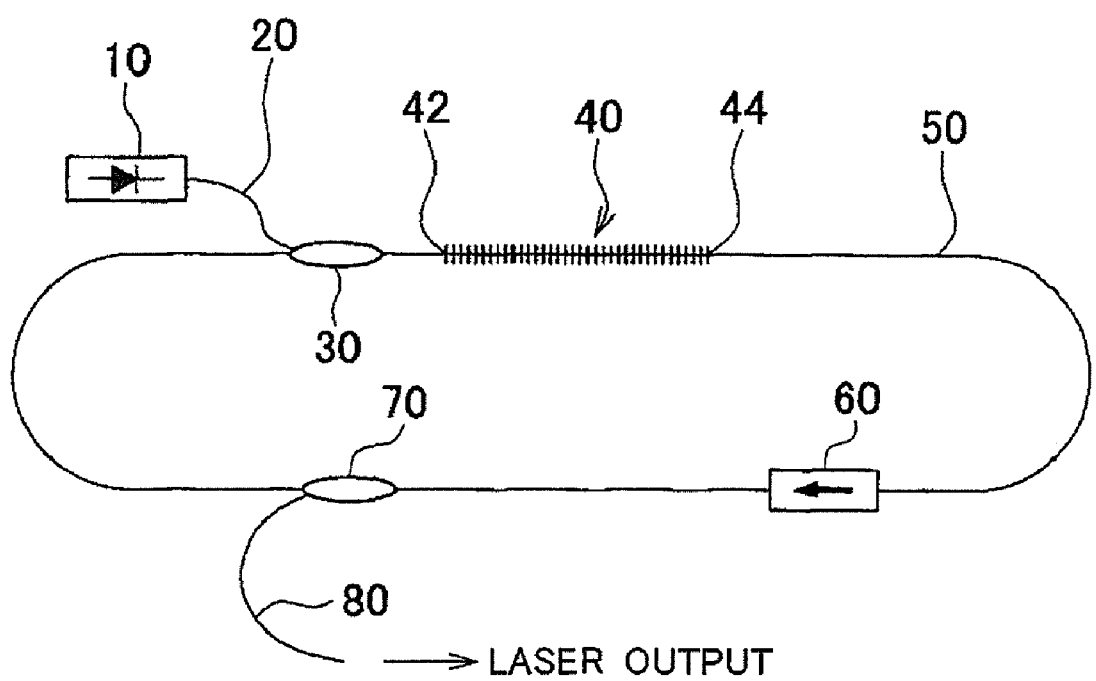
FIG. 4 schematically shows a structure of a laser apparatus 200 which is a comparison example.

FIG. 4 schematically shows a structure of a laser apparatus 200 produced in a different specification, for comparison with the later detailed embodiment example. As shown in this drawing, the laser apparatus 200 includes a DFB fiber laser 40 and an optical feedback path 50 formed by an annular and long optical fiber for connecting an output end 44 and a non-output end 42 of the DFB fiber laser 40. The non-output end 42 of the DFB fiber laser 40 functions as a feedback end. Onto the optical feedback path 50, an optical wavelength multiplexing coupler 30, an optical isolator 60, and an optical coupler 70 are respectively inserted. Here, the optical wavelength multiplexing coupler 30 injects excitation light from the excitation light source 10 towards the non-output end 42 of the DFB fiber laser 40 via the injection port 20, and the optical isolator 60 restricts the direction in which the light on the optical feedback path 50 propagates. Moreover, the optical coupler 70 branches a part of the propagation light on the optical feedback path 50 towards the output port 80.

As mentioned above, by being provided with the optical feedback path 50, the laser apparatus 200 becomes a ring laser. The laser apparatus 200 uses a semiconductor laser having a wavelength of 1480 nm as its excitation light source 10. The optical fiber forming the optical feedback path 50, the length of which is 57 m, is a polarization maintaining fiber of a PANDA-type. This laser apparatus 200 is used to confirm the effect of making the DFB fiber laser 40 to be a ring laser. Note that this laser apparatus 200 is structurally different from the laser apparatus disclosed in the U.S. Pat. No. 6,272, 165, and "Distributed-Feedback Ring All-Fiber Laser," OSA TOPS on Advanced Solid-State Lasers, vol. 1, pp. 291-295 (1996), in that in the laser apparatus 200, the optical fiber forming the optical feedback path 50 is of a polarization maintaining type and the optical isolator 60 is inserted into the optical feedback path 50.

Figure 6:
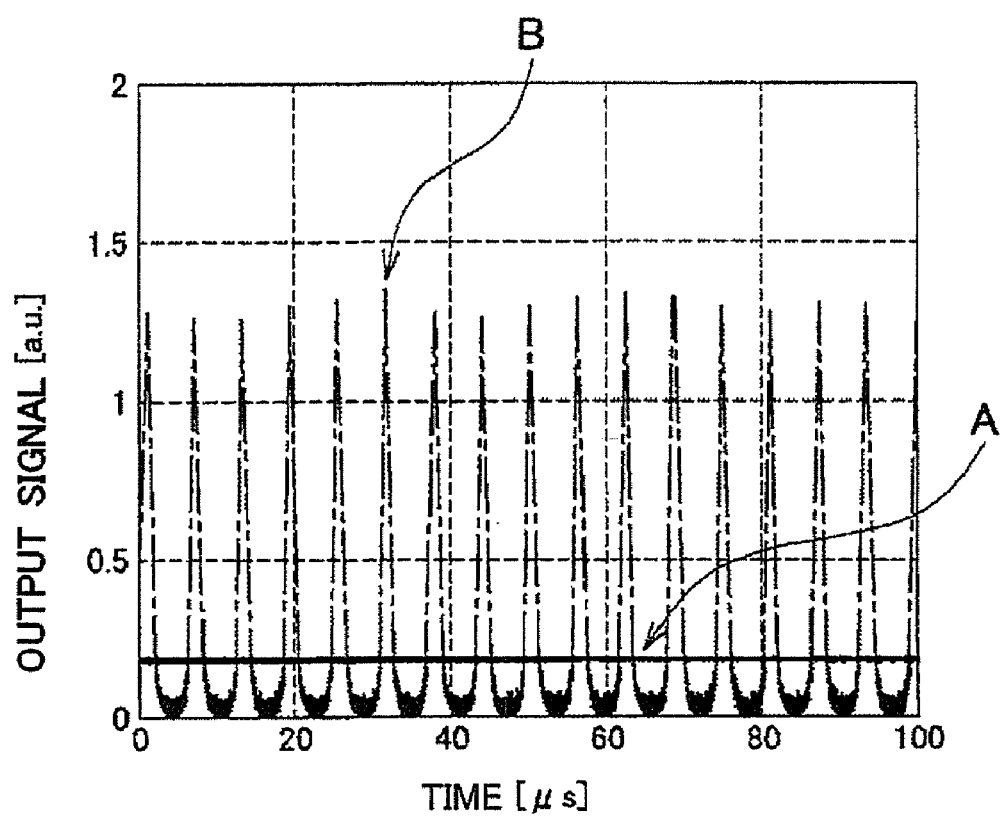
FIG. 6 is a graph representing a temporal change of laser output for the laser apparatus 200.

FIG. 6 is a graph showing a temporal change (curve A) of laser output resulting when the above-described laser apparatus 200 is operated at the excitation power of 60 mW. FIG. 6 also shows a temporal change (curve B) of output resulting when the DFB fiber laser 40 is operated alone, not including the optical feedback path 50. The graph shows that when the DFB fiber laser 40 is operated alone, it pulse-oscillates, whereas the laser apparatus 200 that is formed as a ring laser by inclusion of an optical feedback path 50 successively oscillates.

Figure 7:
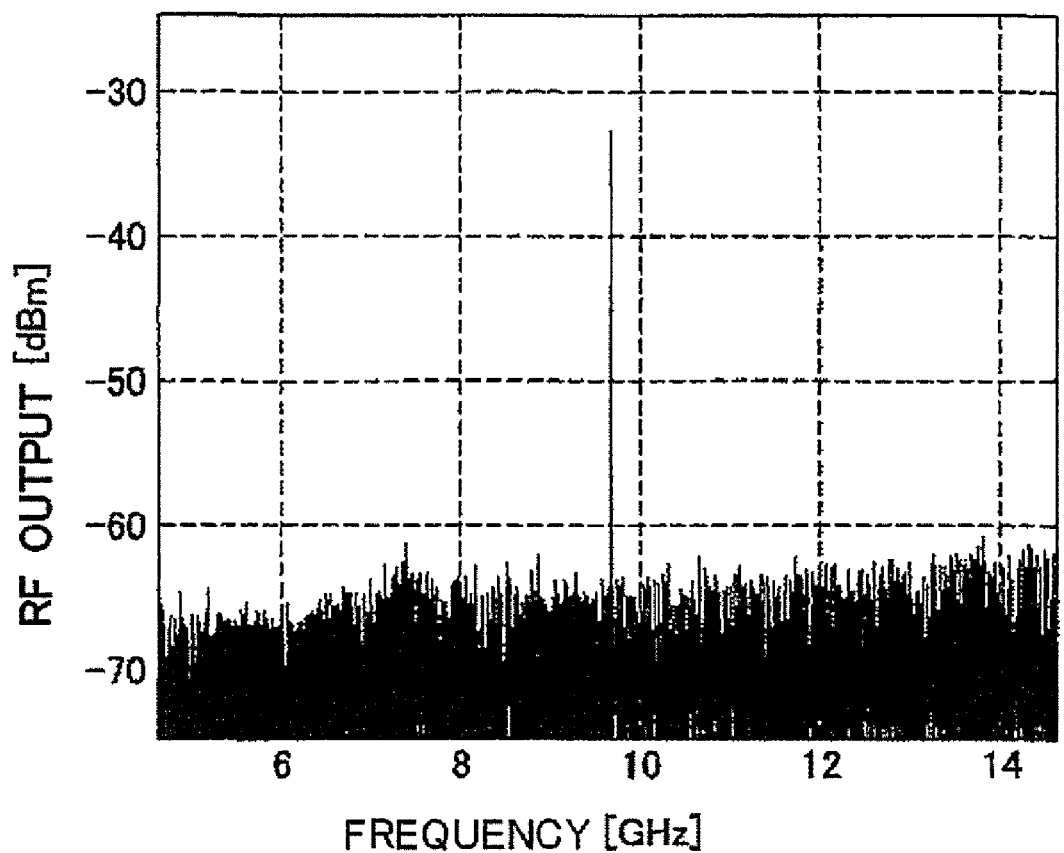
FIG. 7 is a graph representing a waveform of a heterodyne beat signal for the laser apparatus 200.

FIG. 7 shows a heterodyne beat signal between the DFB fiber laser 40 and the semiconductor DFB fiber laser 90 in a stable single mode. As shown in this drawing, even when formed as a ring laser, the laser apparatus 200 oscillates in a single mode.

Figure 8:
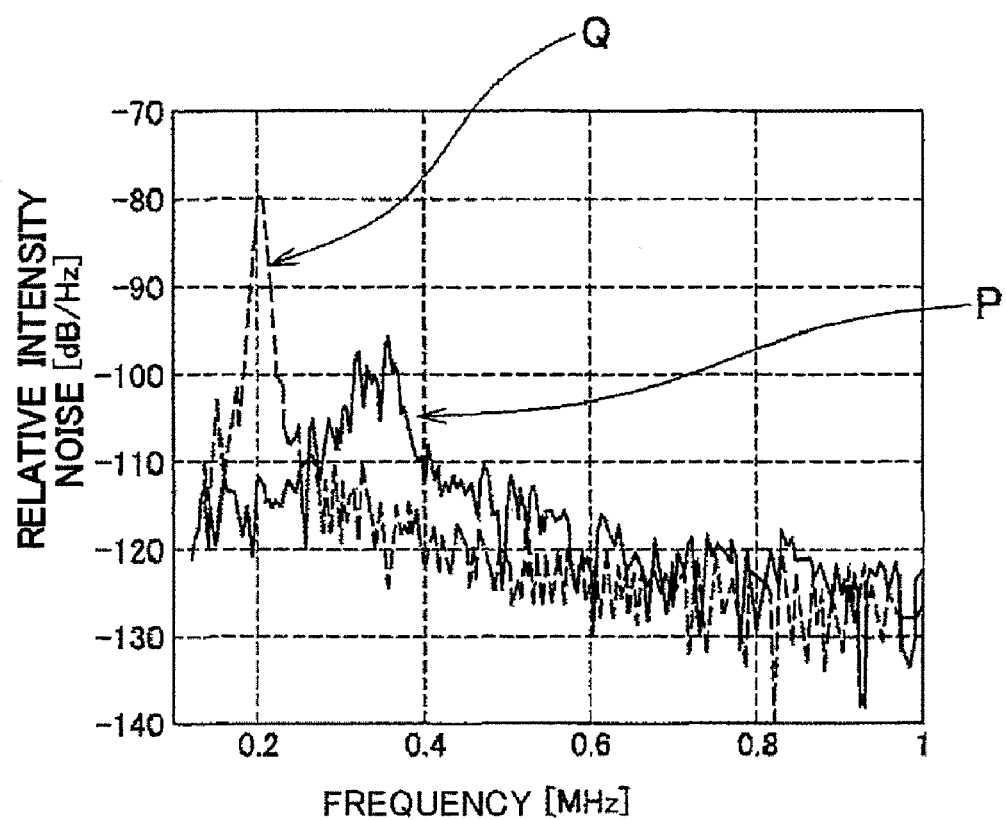
FIG. 8 is a graph representing a relative intensity noise characteristic for the laser apparatus 200.

FIG. 8 shows a graph representing a relative intensity noise characteristic (curve P) resulting when the excitation power supplied form the excitation light source 10 is 100 mW. In addition, FIG. 8 also shows a relative intensity noise characteristic (curve Q) resulting when the DFB fiber laser 40 is operated alone. As shown in this drawing, the relative intensity noise is −80 dB/Hz when the DFB fiber laser 40 is operated alone, whereas the laser apparatus 200 that is formed as a ring laser by inclusion of the optical feedback path 50 has a relative intensity noise reduced down to −96 dB/Hz.

Accordingly, it is confirmed that this laser apparatus 200 successively oscillates, as well causing a reduced amplitude noise.

Figure 9:
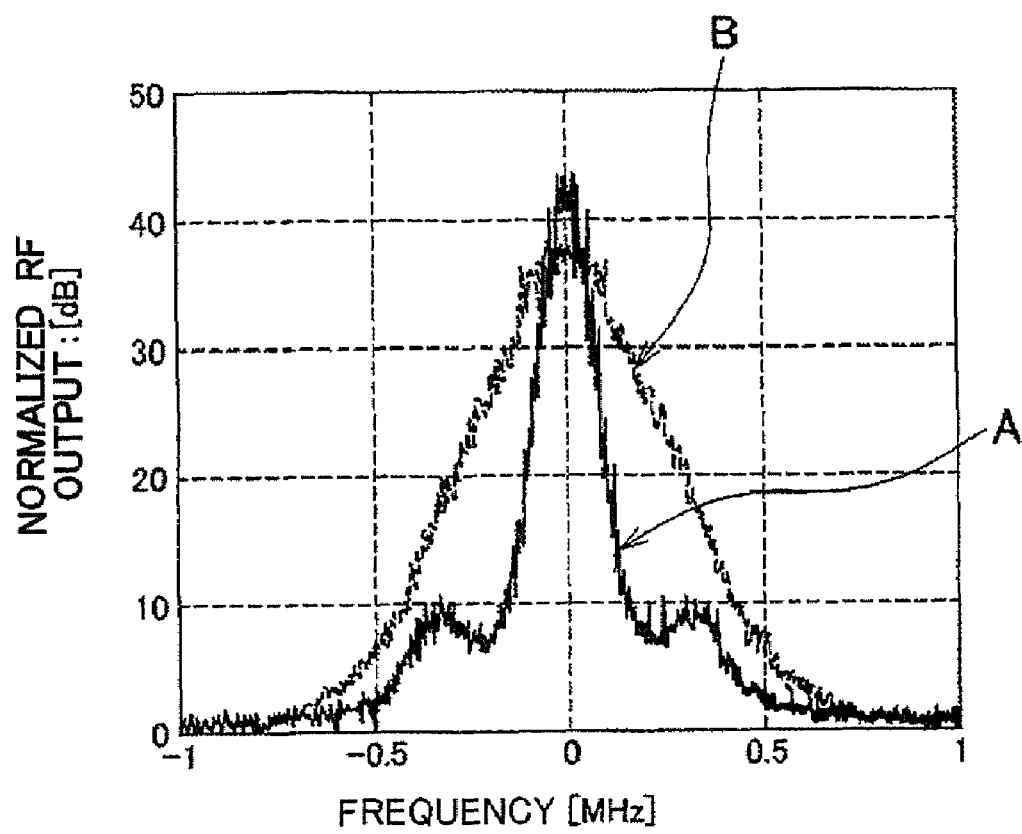
FIG. 9 is a graph representing a waveform of a self-delay heterodyne beat signal for the laser apparatus 200.

FIG. 9 is a graph representing a waveform (curve A) of a self-delay heterodyne beat signal generated by the laser apparatus 200 when the excitation power supplied form the excitation light source 10 is 100 mW. FIG. 9 also shows a self-delay heterodyne beat signal (curve B) when the DFB fiber laser 40 is operated alone. As shown in this drawing, the linewidth is 27 kHz when the laser apparatus 200 is formed as a ring laser by inclusion of the optical feedback path 50, whereas the linewidth is 82 kHz when the DFB fiber laser 40 is oscillated alone. This proves linewidth reduction down to about ⅓ as a result of forming the laser apparatus 200 as a ring laser.

Figure 10:
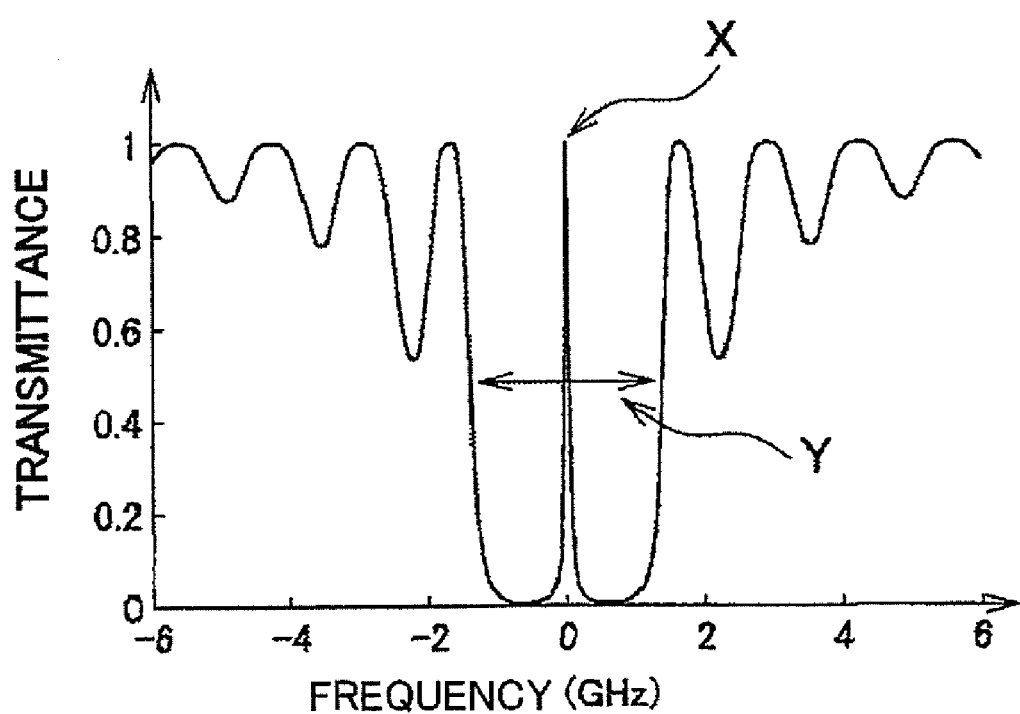
FIG. 10 is a graph representing a transmission spectrum of a λ/4-shifted diffraction grating 41 for the laser apparatus 200.

FIG. 10 is a graph representing a transmission spectrum of a λ/4-shifted diffraction grating 41 in the DFB fiber laser 40. As shown in this drawing, in the λ/4-shifted diffraction grating 41 in the DFB fiber laser 40, the transmission spectrum definitely has a narrow transmission band X in the center of the band gap Y. Accordingly, the DFB fiber laser 40 laseroscillates at the wavelength of the transmission band X. Because of having the optical feedback path 50 as a resonator, the laser apparatus 200 has a further reduced relative noise level, due to repetitive transmission of the laser oscillation light through the optical fiber of a narrowband.

Figure 5:
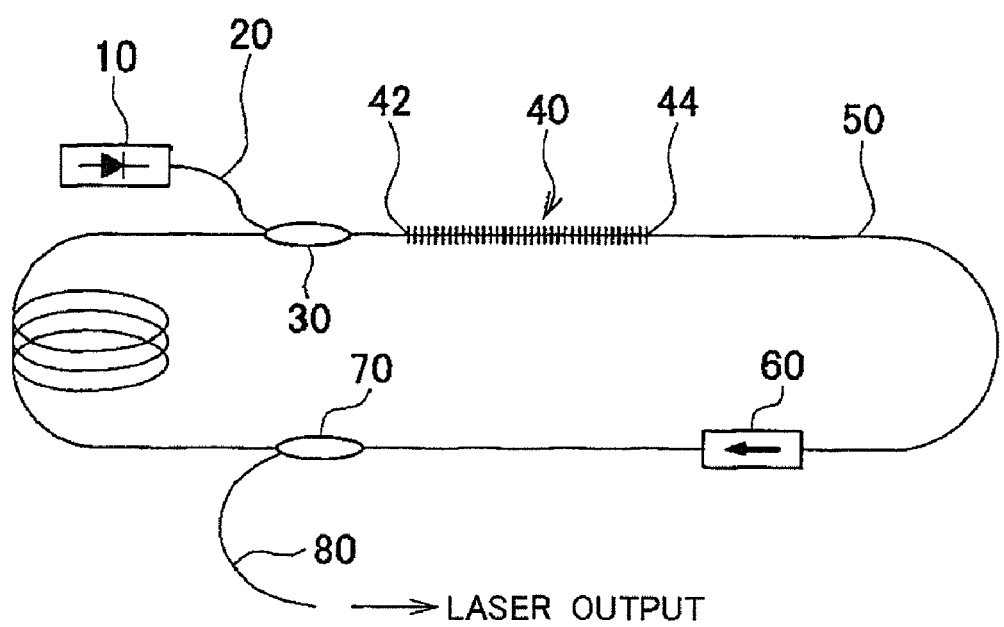
FIG. 5 schematically shows a structure of a laser apparatus 300 according to an embodiment.

FIG. 5 schematically shows a structure of a laser apparatus 300 according to an embodiment. As shown in this drawing, this laser apparatus 300 includes a DFB fiber laser 40 and an optical feedback path 50 formed by an annular and long optical fiber for connecting an output end 44 and a non-output end 42 of the DFB fiber laser 40. Onto the optical feedback path 50, an optical wavelength multiplexing coupler 30, an optical isolator 60, and an optical coupler 70 are respectively inserted. Here, the optical wavelength multiplexing coupler 30 injects excitation light from the excitation light source 10 towards the non-output end 42 of the DFB fiber laser 40, and the optical isolator 60 restricts the direction in which the light on the optical feedback path 50 propagates. Moreover, the optical coupler 70 branches a part of the propagation light on the optical feedback path 50 towards the output port 80. Note that this laser apparatus 300 is structurally different from the laser apparatus 200 shown in FIG. 4, in the length of the optical fiber forming the optical feedback path 50.

Figure 11:
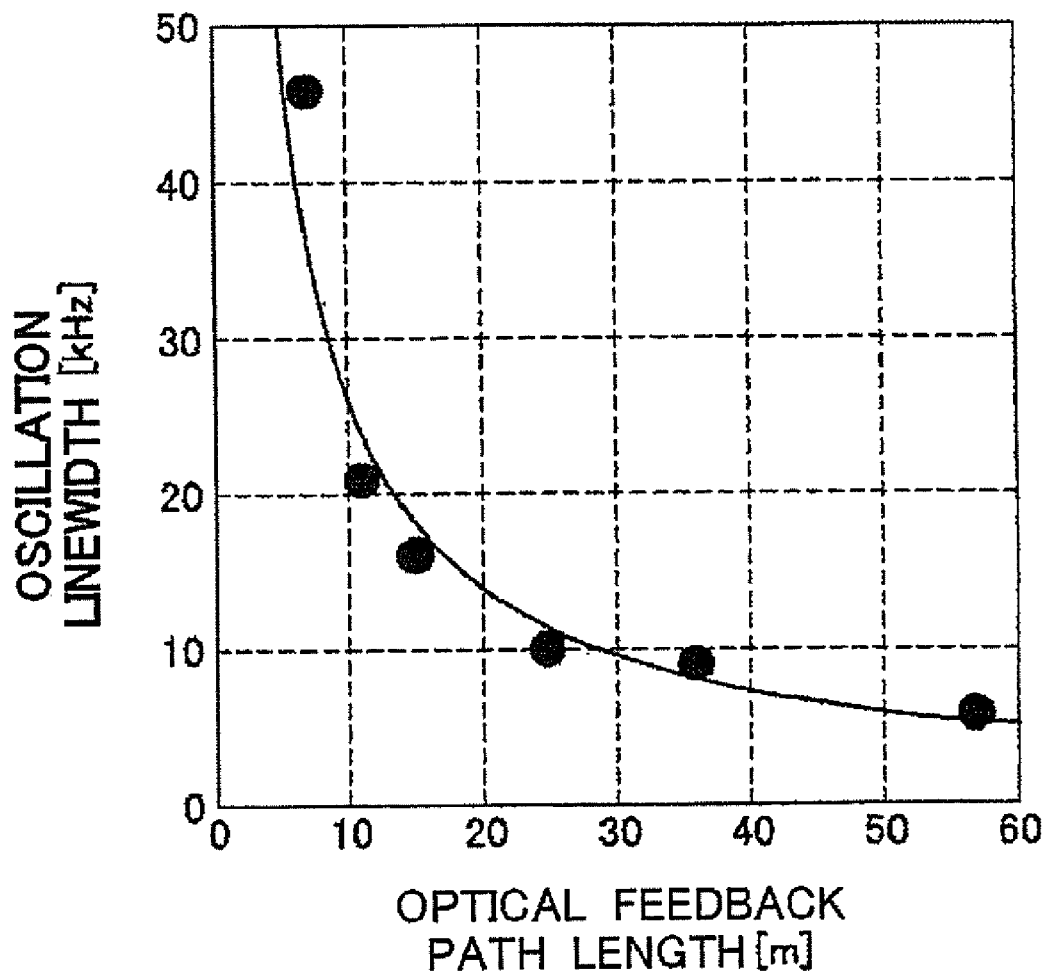
FIG. 11 is a graph representing a relation between a length of an optical feedback path 50 and an oscillation linewidth for the laser apparatus 300.

FIG. 11 is a graph representing a relation between a length of an optical feedback path 50 and an oscillation linewidth for the laser apparatus 300. This drawing shows that as the optical feedback path 50 gets longer, the linewidth of the outputted laser will be narrower. In particular, until the length of the optical feedback path 50 reaches 25 m, the linewidth experiences a significant decrease, which proves a remarkable effect of prolonging the optical feedback path 50.

Figure 12:
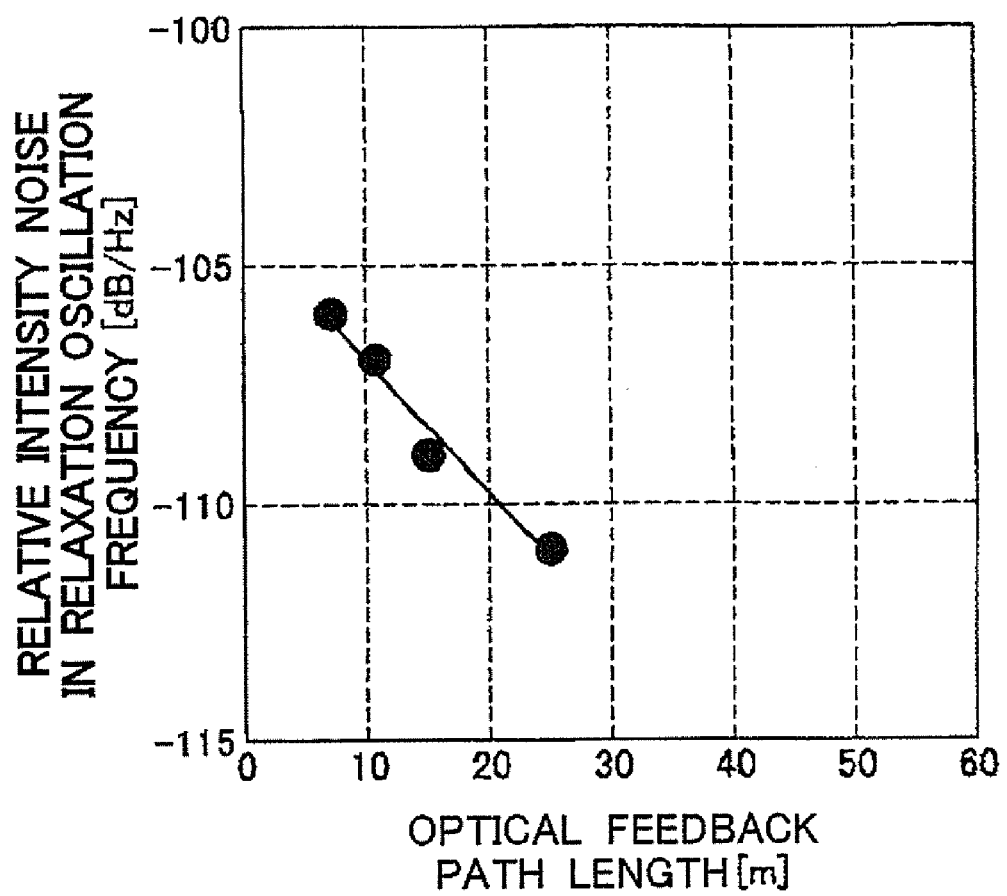
FIG. 12 is a graph representing a relation between the length of the optical feedback path 50 and a relative intensity noise in a relaxation oscillation frequency for the laser apparatus 300.

FIG. 12 is a graph representing a relation between the length of the optical feedback path 50 and a relative intensity noise in a relaxation oscillation frequency for the laser apparatus 300. This drawing shows that as the optical feedback path 50 gets longer, the relative intensity noise in the relaxation oscillation frequency gets smaller. In particular, when the optical feedback path 50 becomes 25 m or longer, the noise peak in the relaxation oscillation frequency becomes the measurement limit or less.

Figure 13:
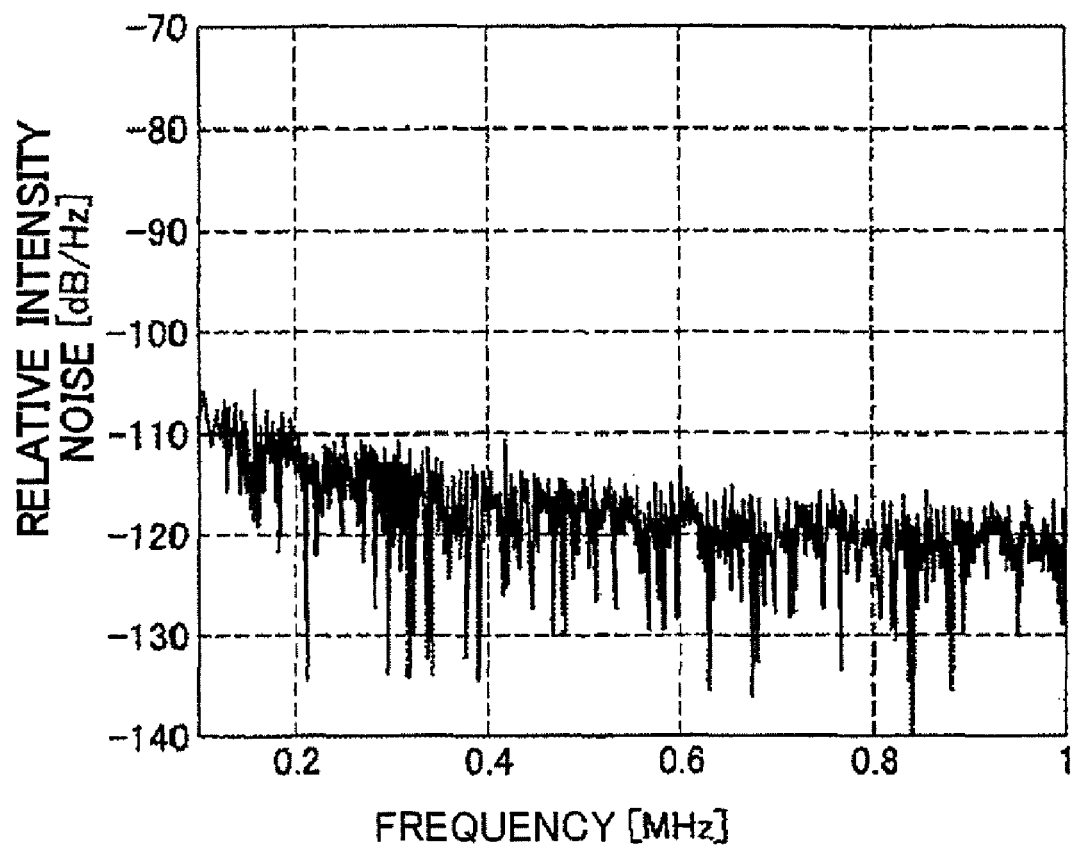
FIG. 13 is a graph showing a relative intensity noise characteristic for the laser apparatus 300, when the length of the optical feedback path 50 is set to be 57 m.

FIG. 13 is a graph showing a relative intensity noise characteristic for a laser output in the laser apparatus 300 having the structure of FIG. 4, when the length of the optical feedback path 50 is set to be 57 m. As clear from the drawing, the relative intensity noise level for the laser output in this laser apparatus 300 is −110 dB/Hz or less throughout a wide band, and there is no band, the relative intensity noise level of which exceeds −105 dB/Hz. In addition, the laser output has a narrow linewidth, as well as low cost and high long-term reliability.

In this way, a laser light source having an extremely low relaxation oscillation noise level is realized, by combining the DFB fiber laser 40 formed by an erbium-doped optical fiber codoped with aluminum, with a long optical feedback path 50.

Embodiment Example 2

Figure 14:
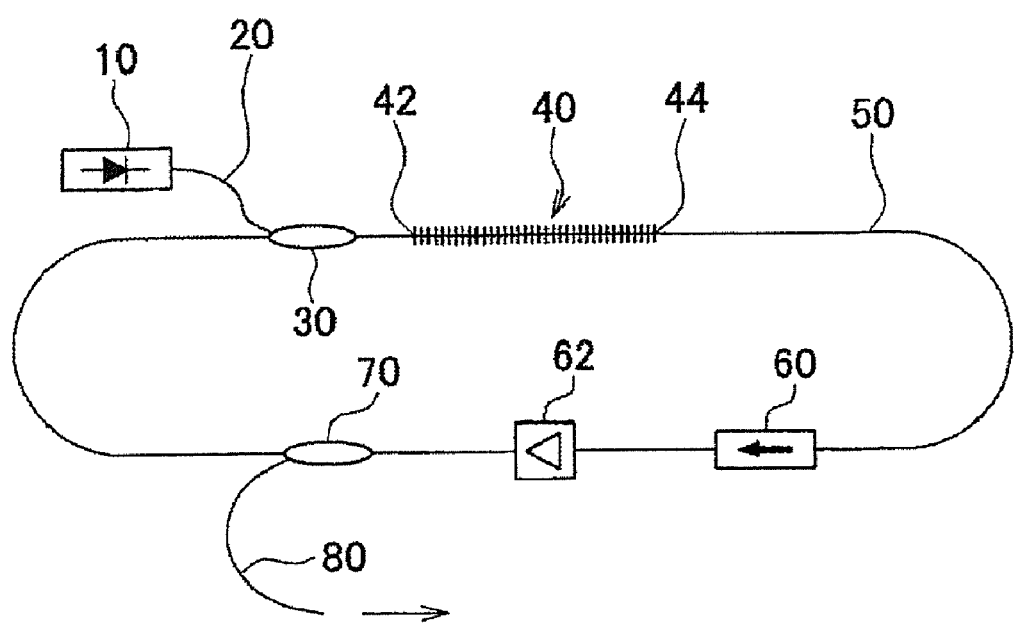
FIG. 14 schematically shows a structure of a laser apparatus 400 according to another embodiment.

FIG. 14 schematically shows a structure of a laser apparatus 400 according to another embodiment. As shown in this drawing, the laser apparatus 400 is characterized by being formed by inserting, onto the ring optical feedback path 50 of the laser apparatus 200 having the structure of FIG. 4, a semiconductor optical amplifier (SOA) 62.

The semiconductor optical amplifier 62 has an optical filter characteristic of cutting off low frequencies in an amplitude saturation characteristic. This characteristic contributes to further noise reduction of the laser apparatus 400.

Although the present invention has been described by way of exemplary embodiments, it should be understood that those skilled in the art might make many changes and substitutions without departing from the spirit and the scope of the present invention which is defined only by the appended claims.

The λ/4-shifted DFB fiber laser having a long ring-type optical feedback path as described above has an advantageous effect of causing extremely low noise, in addition to the original feature of having a long-term reliability. Accordingly, the λ/4-shifted DFB fiber laser can be used as a light source for laser of low noise and narrow linewidth, a light source for optical communication where the phase of an optical signal carries information, or as a light source for ultrahigh stable optical frequency reference.

Particularly, as the frequency multiplexing interval becomes highly dense (100 GHz, 50 GHz, and 25 GHz) in the wavelength multiplexing optical communication system nowadays, signals are required to be arranged at a narrower frequency interval. The ring-type λ/4-shifted DFB fiber laser can be advantageously employed as a signal light source used in such a high density wavelength multiplexing optical communication system. It can also be employed in a coherent optical communication system capable of greatly increasing the transmission capacity, as a light source of the coherent optical communication or as a local oscillation source of a receiver.

Other than in the optical communication field, this laser apparatus can also be employed in the field of optical sensor where the Doppler effect or the interference effect is used to obtain environmental information such as a position and vibration, to enable more detailed and accurate measurement.

Although some aspects of the present invention have been described by way of exemplary embodiments, it should be understood that those skilled in the art might make many changes and substitutions without departing from the spirit and the scope of the present invention which is defined only by the appended claims.

What is claimed is:

1. A laser apparatus comprising:
a DFB fiber laser including, as an amplitude medium, a rare earth doped silica optical fiber codoped with aluminum and having first and second ends, light incident on the first end being amplified and the amplified light being outputted from the second end;

an optical feedback path formed by a ring-shaped optical fiber extending from the second end to the first end; and an optical coupler feeding back a part of an output of the second end to the first end via the optical feedback path, and outputting, to outside, another part of the output of the second end, wherein the optical fiber forming the optical feedback path does not amplify the part of the output fed back to the first end by the optical coupler and is longer than a length at which a relaxation oscillation noise in the output to the outside becomes −110 dB/Hz.

2. The laser apparatus according to claim 1, wherein the optical fiber forming the optical feedback path is equal to or longer than 25 m.

3. The laser apparatus according to claim 1, further comprising:

a semiconductor optical amplifier inserted into the optical feedback path.

4. The laser apparatus according to claim 3, wherein the semiconductor optical amplifier has an optical filter characteristic of cutting off low frequencies in an amplitude saturation characteristic.

5. The laser apparatus according to claim 1, wherein the optical fiber is of a polarization maintaining type.

6. The laser apparatus according to claim 5, wherein the optical fiber is a polarization maintaining optical fiber of a PANDA-type.

7. The laser apparatus according to claim 1, wherein an optical isolator is inserted into the optical feedback path.

8. The laser apparatus according to claim 1, wherein the optical fiber has a core codoped with 0.4 wt % erbium and 12 wt % aluminum.

9. The laser apparatus according to claim 2, further comprising:

a semiconductor optical amplifier inserted into the optical feedback path.

10. The laser apparatus according to claim 9, wherein the semiconductor optical amplifier has an optical filter characteristic of cutting off low frequencies in an amplitude saturation characteristic.

* * * * *